United States Patent [19]

Kolodzey et al.

[11] 4,245,886
[45] Jan. 20, 1981

[54] FIBER OPTICS LIGHT SWITCH

[75] Inventors: James S. Kolodzey, Ossining, N.Y.; George R. Stilwell, Jr.; Edward C. Uberbacher, both of Raleigh, N.C.

[73] Assignee: International Business Machines Corporation, Armonk, N.Y.

[21] Appl. No.: 73,771

[22] Filed: Sep. 10, 1979

[51] Int. Cl.³ .............................................. G02B 5/14
[52] U.S. Cl. .................. 350/96.20; 350/267; G05D/25/00
[58] Field of Search ............... 350/96.10, 96.20, 96.32, 350/266, 267

[56] References Cited

U.S. PATENT DOCUMENTS

| | | | |
|---|---|---|---|
| 3,558,891 | 1/1971 | Kaiser | 350/96.32 |
| 3,582,907 | 1/1971 | Taylor et al. | 350/267 |
| 3,612,657 | 10/1971 | Sawyer | 350/267 |
| 3,655,267 | 4/1972 | Forlini | 350/267 |
| 3,874,779 | 4/1975 | Thiel | 350/96.16 |
| 3,922,063 | 11/1975 | Marrone | 350/96.15 |

Primary Examiner—Stewart J. Levy
Attorney, Agent, or Firm—Gerald R. Woods

[57] ABSTRACT

A light switch for controlling the transmission of optical energy through optical fibers includes a hollow, light-transmitting tube extending transversely across the end of at least one light transmitting fiber. The tube contains one or more masses of light diverting material in a matrix of light-transparent fluid. The masses of light diverting material may be reflective, refractive or absorbent. Means are provided for varying the pressure along the tube to shift the masses relative to the light transmitting fiber so as to divert or pass the light to receiving fibers.

13 Claims, 8 Drawing Figures

FIBER OPTICS LIGHT SWITCH

TECHNICAL FIELD

The present invention relates to optical communications and more particularly to a fiber optics light switch for selectively diverting optical energy transmitted through an optical fiber.

PRIOR ART

There is a considerable amount of interest in optical fibers among manufacturers and users of electronic data communication and data processing systems. Optical fibers can, at least potentially, transmit data in the form of optical signals at bit rates far higher than the bit rates possible with conventional conductors. Moreover, optical fibers are not subject to some of the problems which have plagued conventional electrical communications and data processing systems. Optical fibers provide excellent security for transmitted data since little, if any, optical energy is radiated from the fiber. An optical fiber cannot be readily tapped and, unlike an electrical cable, cannot be easily monitored by a signal "induction" process. Since little or no optical energy is radiated from a fiber, there is no significant cross talk between adjacent fibers in a multi-fiber cable. Further, optical fibers are normally immune to the distortive effects of electromagnetic noise generated within or external to the system employing the fibers.

While optical fibers offer numerous advantages over electrical conductors in certain data processing and communications environments, the use of fiber optics in those environments also poses certain problems which have discouraged more widespread development of such systems. One of those problems has been the lack of a reliable, low cost mechanism capable of switching optical data between different fibers or sets of fibers in the system.

Various techniques have been suggested for performing the switching function. One suggested technique is to mechanically shift or move the end of a fiber between alignment with two or more other fibers.

While a purely mechanical switch has the advantage of using proven, uncomplicated technology, such a switch does have certain drawbacks. Because it is mechanical in nature and must be carefully fabricated in order to provide proper alignment of the extremely thin optical fibers, such a switch is likely to be undesirably expensive. Moreover, like any mechanical element, such a switch will be subject to wear. Periodic maintenance and adjustment will be required to maintain alignment of the fibers being switched. In addition, the ends of the alignable fibers must be spaced from one another to provide mechanical clearance during switching. Excessive spacing can lead to considerable loss in optical signal strength at the interface between the two fibers. Moreover, a mechanical switch is likely to be bulky and subject to contamination from dust particles in the ambient environment.

Another proposed light switching arrangement uses a transparent member having a beveled face. An electromagnetic solenoid is used to control movement of the transparent member into or out of a liquid-filled light transmission path between two optical fiber terminals.

When the transparent member is out of the light transmission path, optical signals are transmitted along the path between the two terminals. When the transparent member is inserted into the path, optical signals are intercepted and reflected at right angles to the path to a detector aligned with the transparent member. By substituting a light source, such as a light emitting diode, for the detector, the same mechanism can also be used to selectively introduce electrical signals into the light transmission path.

While this mechanism has certain advantages over a purely mechanical switch, it also has certain drawbacks. Because the transparent member extends through a port into a fluid filled path, a fluid tight seal must be provided and maintained. The arrangement is likely to be undesirably expensive due to the need for the solenoid and special fluid-filled light transmission path. Moreover, the mechanism would not seem to be well suited for controlling parallel optical data paths. Parallel arrays of solenoid-actuated transparent members would be expensive, and the different response times of individual solenoids upon even simultaneous energization might prevent the channels of a parallel bus from being switched simultaneously.

Still another suggested light switch requires a chamber within an optical fiber path with parallel chamber walls extending at an angle to the fiber axis. The switch includes a reservoir for a vaporizable light-transmitting fluid. When the liquid is in its unheated state, the chamber is filled with a vapor which reflects light. When the reservoir is heated, the liquid expands from the reservoir to fill the chamber. Because the liquid is transparent, incoming optical data is transmitted along the optical fiber path through the chamber.

While such a device has the advantage of having no mechanical moving parts, it is likely to be costly since special liquid-controlling heaters or devices must be provided. Moreover, the dimensions of the chamber presumably have to be very closely controlled in order to assure that the liquid would vaporize properly under normal operating conditions. In addition, the disclosed switch is used to control a single light fiber. If a plurality of switches were to be used in parallel to control a parallel optical data bus, synchronization problems could be expected since minute differences in liquid quantities, chamber dimensions, heater characteristics, etc., could cause the various switches to operate at different times.

SUMMARY OF THE INVENTION

Many of the known disadvantages of the prior art light switches are overcome in a light switch constructed in accordance with the present invention. Such a switch is used to selectively divert optical energy normally transmitted from a first optical fiber to a second, axially-aligned optical fiber. The switch includes a hollow, light-transmitting tube which extends transversely between the adjacent ends of the two fibers. The tube contains a discrete mass of light diverting material in a matrix of light transmitting fluid. Means are provided for altering the pressure within the hollow tube to move the discrete light diverting mass to desired positions relative to the two aligned fibers.

DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein:

DETAILED DESCRIPTION

Figure 1:
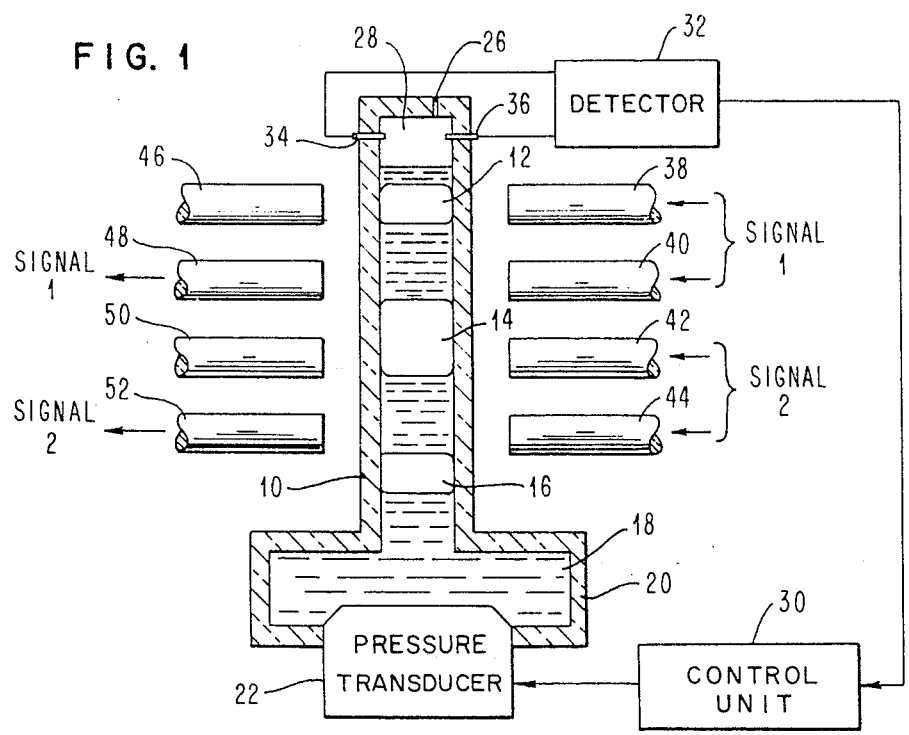
FIG. 1 is a schematic representation of one embodiment of a light switch constructed in accordance with the present invention.

FIG. 1 shows a light switch constructed in accordance with the present invention which can serve the function of a one-to-two demultiplexer; that is, which can direct a single input signal to either of two separate output paths as a function of a control signal.

The light switch includes a hollow tube 10 made of a material which is transparent to optical energy. Tube 10 carries one or more masses 12, 14, 16 of light diverting material spaced from one another in a matrix of relatively incompressible light transmitting fluid 18. One end of the hollow tube 10 is preferably enlarged to form a reservoir 20 for the light transmitting fluid 18. One wall of reservoir 20 is at least partially formed by a pressure transducer 22 which is used to vary the volume available for fluid in reservoir 20. The opposite end of tube 10 may be open to atmospheric pressure through a small vent tube 26 to provide a relatively constant pressure in volume 28 at one end of the tube. In the alternative, a reservoir similar to reservoir 20 may be provided at the upper end of tube 10.

A control unit 30 operates the transducer 22 to vary the fluid volume of reservoir 20. When the fluid volume is reduced, the increased pressure in reservoir 20 forces the light diverting masses 12, 14 and 16 upward in tube 10. If a second reservoir is provided at the upper end of tube 10, the transducer for that second reservoir would operate out of phase with the transducer 22. For example, when transducer 22 increases the fluid pressure by decreasing reservoir volume, then the second transducer would simultaneously decrease the fluid pressure at the other end of the tube 10.

The position of at least one of the light diverting masses may be monitored by a detector 32 having mass-detecting terminals 34 and 36. The light diverting masses may be mercury droplets. If they are, terminals 34 and 36 may be simple electrodes which can be bridged by one of the mercury droplets to close a signal path within detector 32. While only one set of mass-detecting terminals is shown, providing the capability only of determining whether a mercury droplet has been forced into a particular position, additional terminals could be provided at other points along the tube to provide positive signals indicating that the same or other mercury droplets have entered particular positions.

Since the tube is optically transparent, conventional photodetector components could be used in place of the electrodes. One advantage of such components is that they could be located outside the tube 10.

The light diverting masses must, of course, be relatively incompressible and immiscible in the surrounding light transmitting fluid. The characteristics of the light-diverting masses may otherwise vary according to the particular system in which they are used. The masses may be reflective, refractive or even light absorbent since masses having any of these properties will affect the transmission of optical energy.

The light switch described above can be used as a one-to-two demultiplexer. For such an application, identical input signals are applied at pairs of incoming or transmitting optical fibers. For example, signal 1 is applied simultaneously to optical fibers 38 and 40. A second input signal is presented in parallel on optical fibers 42 and 44. Four optical fibers 46, 48, 50, 52 provide output signal paths. Each of the output fibers is axially aligned with one of the input fibers.

Depending upon the positions of the light diverting masses 12, 14, 16 within tube 10, signal 1 will be applied either to output fiber 46 or output fiber 48 while signal 2 will be applied to only one of the output fibers 50 and 52. For the switch as illustrated, light diverting mass 12 prevents the signal received from fiber 38 from being transmitted to output fiber 46. The signal applied through input fiber 40 is, on the other hand, transmitted through the optically transparent walls of tube 10 and the optically transparent fluid 18 directly to the output fiber 48. Similarly, mass 14 blocks the signal applied over input fiber 42 while the signal applied over input fiber 44 is transmitted through the switch to the output fiber 52.

If the positions of light diverting masses are changed by shifting those masses within tube 10, the data path will be shifted to the second set of output fibers. That is, signal 1 will be transmitted from input fiber 38 to output fiber 46 through the clear fluid between masses 12 and 14. Similarly, signal 2 will be transmitted from input fiber 42 to output fiber 50 through the clear fluid between masses 14 and 16. Under these conditions, mass 14 will isolate output fiber 48 from input fiber 40 while mass 16 isolates output fiber 52 from input fiber 44.

Clearly, the spacing of the light diverting masses and their size relative to the size of the optical fibers must vary as a function of the fiber size and spacing. Each mass has to be large enough to completely isolate an output fiber from its aligned input fiber when interposed between the two. Generally, the mass size and spacing will be such that each mass is completely removed from any optical path when the switch is in at least one of its two normal positions. The only exception might be where a double size mass, such as mass 14 can be used to control adjacent fibers which are switched out of phase with one another.

Figure 2:
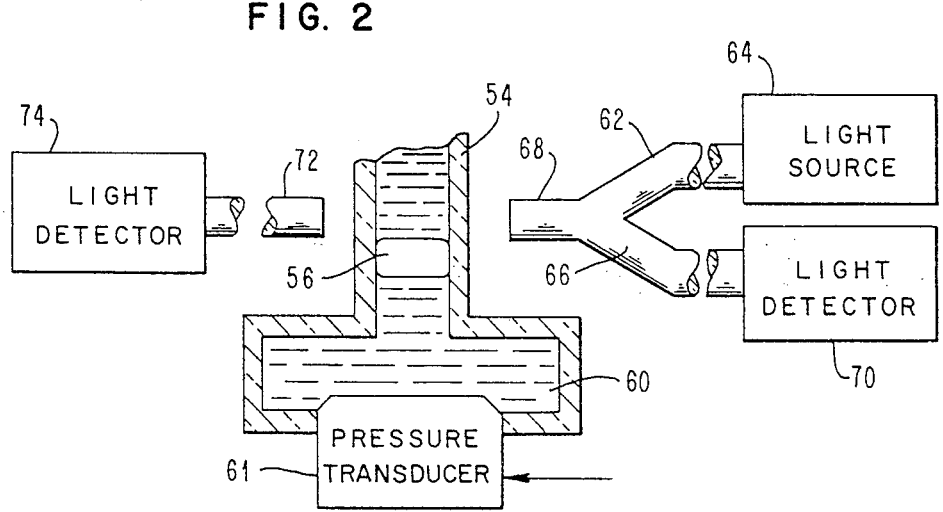
FIG. 2 is a partial schematic representation showing a particular application for a light switch constructed in accordance with the present invention.

The above-described switch performs a signal switching function simply by blocking one of two identical input signals. The same switching function can be performed with a single input fiber. FIG. 2 shows one embodiment of such a system. A hollow tube 54 made from optically transparent material includes a single mass 56 of light reflecting material, such as a mercury droplet. The reflective mass 56 is surrounded by light transmitting fluid 58. As discussed earlier, the position of reflective mass 56 can be controlled by varying the pressure on fluid 58 at a reservoir 60 with a transducer 61.

The optical system in which this switch is to be used includes an input fiber 62 for carrying signals provided by a source 64. The input fiber 62 is one part of a Y-shaped fiber combination including an output fiber 66 and a common fiber 68 which carries both input and output signals under certain conditions. Fiber 66 terminates in a light detector 70.

A second output fiber 72 is aligned with the common fiber 68 on the opposite side of hollow tube 54. The output fiber 72 terminates in another light detector 74.

When the mass 56 is in the position illustrated, optical signals generated by light source 64 travel through input fiber 62, common fiber 68, hollow tube 54 and output fiber 72 to light detector 74. To change the signal path, the pressure in reservoir 60 is increased by the transducer 61 to move reflective mass 56 into alignment between fibers 68 and 72. Signals from source 64 are still applied through input fiber 62 and common fiber 68. However, the reflective mass 56 isolates output fiber 72, causing the optical energy to be reflected through common fiber 68 and output fiber 66 to light detector 70.

Before reflective mass 56 will reflect an input signal through common fiber 68 to light detector 70, the surface presented by mass 56 must be substantially planar and normal to the common axis of fibers 68 and 72. By tilting the planar surface of the reflective mass relative to the axis of the input fiber, completely separate input and output fibers can be used in place of the Y-shaped fiber assembly described above.

Figure 3:
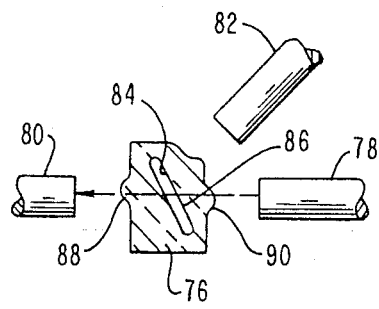
FIGS. 3 and 4, taken together, show an alternate embodiment of the invention in two possible operating states.

Referring to FIG. 3, a hollow, optically transparent tube 76 extends transversely in the space between a signal input fiber 78 and a first signal output fiber 80. A second output fiber 82 extends away from the light switch at an angle to the common axis of aligned fibers 78 and 80. The transverse opening 84 through tube 76 has at least one major planar surface 86. A normal from the planar surface 86 bisects the angle between the axes of input fiber 78 and output fiber 82.

Tube 76 is connected to a reservoir and a transducer in the same manner as other light switches already described. The opening 84 includes at least one discrete mass of reflective material in a matrix of light transmitting fluid. When the light transmitting fluid is interposed between fibers 78 and 80, optical signals applied to the switch through fiber 78 pass directly through the tube 76 and the light transmitting fluid to the output fiber 80.

Figure 4:
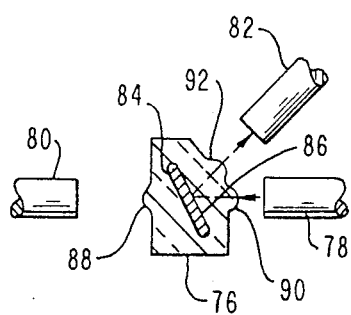

FIG. 4 shows the same switch with a reflective mass shifted into a position within tube 76 between the input fiber 78 and the output fiber 80. Optical signals applied to the switch through input fiber 78 are specularly reflected from the reflective mass toward the second output fiber 82. Since the planar surface 86 of the opening 84 is normal to the bisector of the angle defined by the axes of fibers 78 and 82, the reflected optical energy follows a path coincident with the axis of fiber 82.

The external surfaces of the tube 76 may include lenticular elements, such as elements 88, 90, and 92, which serve to focus the optical energy entering and leaving the switch. Such focusing reduces losses in signal strength which might otherwise occur due to scattering of the optical signal at the internal and external interfaces of the switch.

Figure 5:
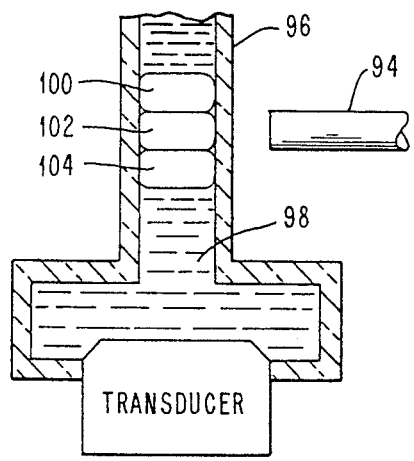
FIG. 5 is a partial schematic representation of still another embodiment of the invention.

The light switches described thus far have employed either light blocking or light reflecting material to select one of two output paths. By incorporating discrete masses of light diverting materials of different characteristics into a single tube, a single input signal may be directed to one of at least three output fibers or simply blocked. Referring to FIG. 5, an input fiber 94 is shown adjacent a hollow, optically transparent tube 96 which is partially filled with light-transmitting fluid 98. The tube 96 may also contain three discrete masses 100, 102, 104 of light diverting materials having different optical characteristics. Mass 100 may be a highly reflective mass. Mass 102 may be a refractive mass capable of bending incident light. Mass 104 may be light absorbent.

Figure 6:
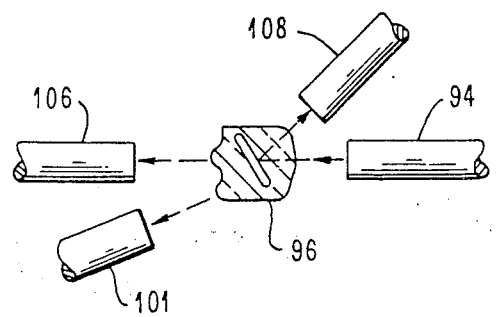
FIG. 6 is a front view of a fiber optic system into which the switch shown in FIG. 5 is incorporated.

Referring to FIG. 5 and FIG. 6 together, when the fluid 98 is aligned with input fiber 94, input optical signals are transmitted through the light switch to an axially aligned output fiber 106. If the reflective mass 100 is aligned with input fiber 94, the applied signals are reflected to a second output fiber 108. If the refractive mass 102 is aligned with input fiber 94, the applied optical data signals are refracted to a third output fiber 110. If the light absorbent mass 104 is aligned with input fiber 94, the optical energy is simply absorbed or blocked to form an optical open circuit.

Figure 7:
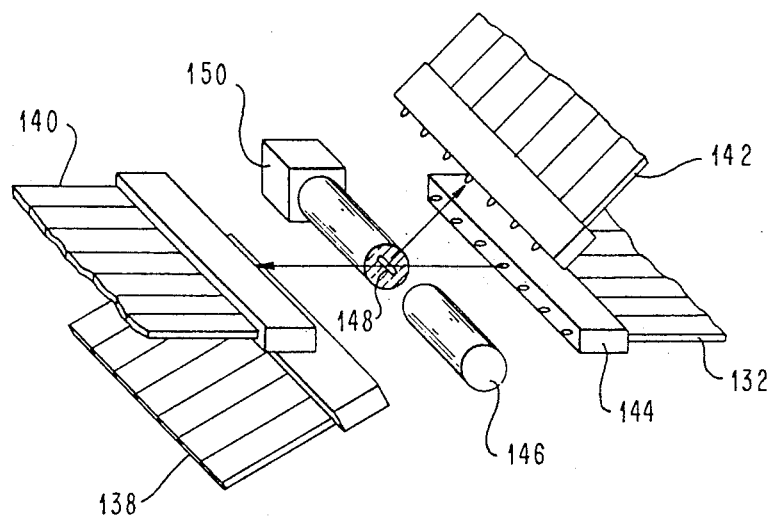
FIG. 7 is a perspective of a switchable system of optical ribbon cables which provide parallel data paths.

Switches constructed in accordance with the present invention can advantageously be used to perform synchronized switching of optical data presented over parallel optical fibers. Referring to FIG. 7, the data paths include an input ribbon cable 132 and three separate output ribbon cables 138, 140, 142. Each of the ribbon cables is terminated in a conventional terminator block, such as block 144, for protecting and maintaining the spacing of the fiber ends.

For the illustrated cable configuration, a transparent hollow tube 146 will include a channel 148 filled with reflective and refractive masses in a matrix of light transmitting fluid. The tube may also include light absorbent masses. Such a switch is basically an extended version of the switch already described with reference to FIGS. 5 and 6 with a plurality of groups of light diverting masses being used instead of the single group of masses 100, 102, 104. Each group of masses is, of course, separated by a section of light transmitting fluid.

Once the spacing of the light diverting masses is established during manufacture of the optical switch, those masses will be shifted in synchronism as a result of pressure changes created by a switch transducer 150. Simultaneous switching of incoming parallel data signals to a selected output cable will be maintained throughout the life of the switch.

Figure 8:
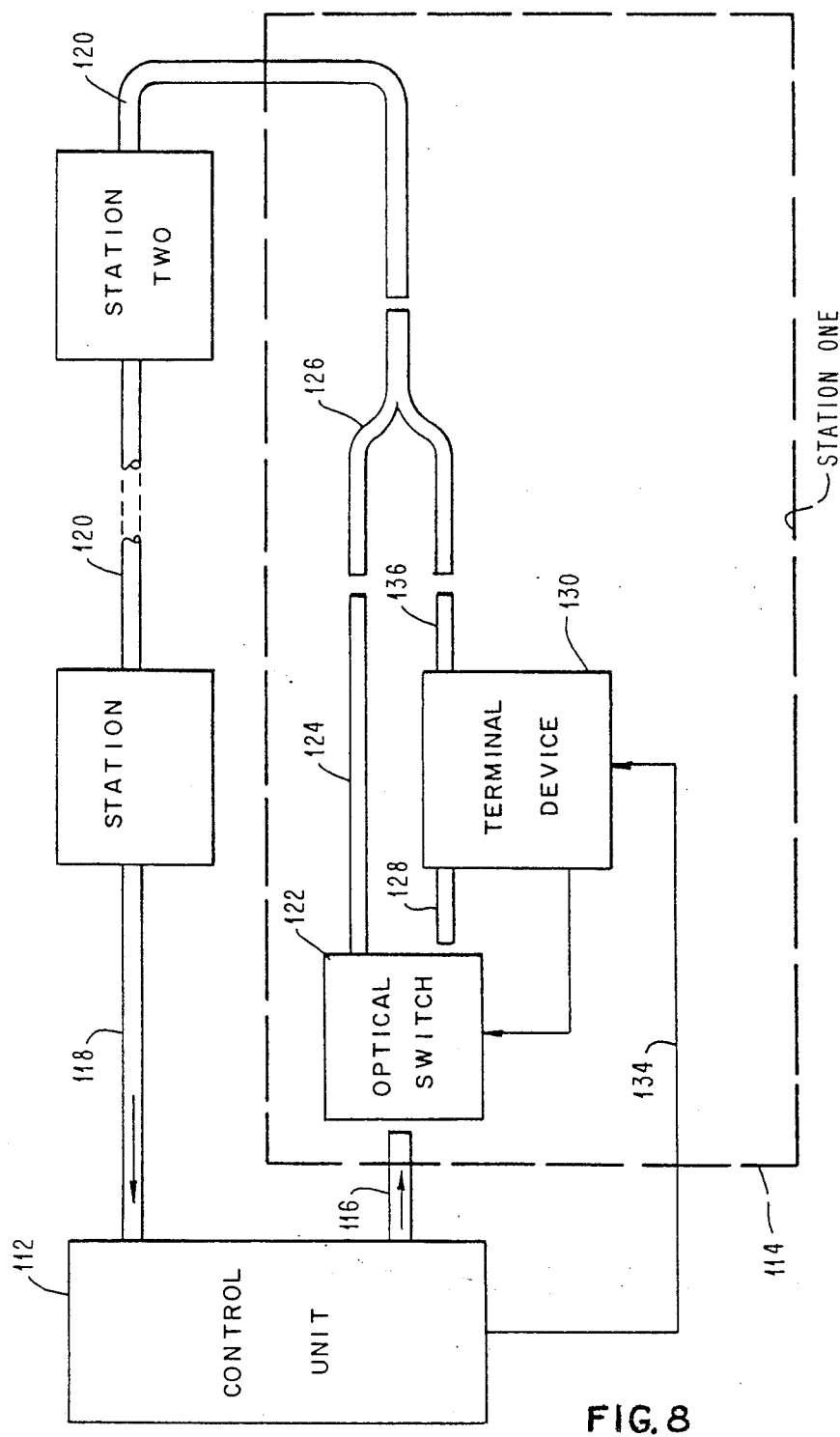
FIG. 8 is a schematic system diagram showing a potential application of light switches constructed in accordance with the present invention.

Optical switches constructed in accordance with the present invention can be incorporated into optical equivalents of electronic data communication systems. An optical loop communication system is shown in block diagram form in FIG. 8. The system includes a control unit 112 and one or more stations, such as station 114, connected in series along a loop which begins and ends at the control unit 112. As in a typical loop, all data flows through the loop in one direction one bit at a time. The first data channel 116, the last data channel 118 and each interstation channel 120 preferably consists of a single optical fiber. Referring to station 114 as an example, each station includes an optical switch 122 for receiving the data signals supplied over the incoming channel. One output fiber 124 from switch 122 is a bypass fiber which can apply the incoming signal directly to a beam-combining optical Y 126. The other output fiber 128 provides an input to a terminal device 130, which may be a point of sale terminal, printer, data entry terminal or any other data processing unit designed to interface with a control unit through a communications loop. Terminal device 130 provides a second optical input to the optical Y 126.

Terminal device 130 is also connected to control unit 112 through a separate control circuit 134 which may be electrical or optical in nature. Terminal device 130, in turn, supplies control signals to optical switch 122 to cause the station to be operated in either a normal mode or a bypass mode.

In the normal mode of operation, optical switch 122 receives the polling signals supplied over the channel 116. Switch 122 isolates the bypass fiber 124, causing the input signal to be applied to terminal device 130 through the fiber 128. Terminal device 130 typically responds to the applied polling signals by generating a stream of data signals which are applied to optical Y 126 over an output fiber 136. During normal mode operation, signals received from the terminal over fiber 136 are routed by Y 126 into the next interstation channel 120.

The station will operate in the manner described above as long as it is powered up, regardless whether it simply passes on the polling signal or generates a data stream to be sent to the control unit 112 through the remainder of the loop. If the terminal device 130 is to be taken out of the loop for any reason, including lack of demand, maintenance and the like, the station enters into a bypass mode of operation. In this mode, optical switch 122 diverts incoming signals to bypass fiber 124. Optical Y 126 routes the signals into interstation channel 120.

For the system to function properly, the optical switch 122 must be capable of diverting signals to bypass fiber 124 when the terminal device 130 is taken out of the loop by removing all power to the device. A reflective optical switch of the type shown in FIGS. 3 and 4 will serve adequately as optical switch 122. The switch must be designed to pass signals to the fiber 124 when the reflective mass comes to rest in the absence of power to the switch.

While there have been described what are considered to be preferred embodiments of the present invention, variations and modifications therein will occur to those skilled in the art once they become familiar with the basic concepts of the invention. For example, several of the figures show a switch for use with a single data path. Clearly, such switches could be adapted to provide simultaneous switching of parallel data paths by elongating the hollow tube and by providing a plurality of properly spaced masses of light diverting material in the manner similar to that illustrated in FIG. 1. Therefore, it is intended that the appended claims shall be construed to include both the preferred embodiments and all variations and modifications that fall within the true spirit and scope of the invention.

Having thus described my invention, what I claim as new, and desire to secure by Letters Patent is:

1. A fiber optics light switch for selectively diverting optical energy normally transmitted from a first optical fiber to a second, axially-aligned optical fiber, said switch including:
   a hollow, light transmitting tube extending transversely through a space between adjacent ends of the first and second fibers;
   a mass of light diverting material contained within said hollow tube in a matrix of light transmitting fluid; and
   means for altering the pressure within said hollow tube to move said light diverting mass to desired positions relative to the first and second optical fibers.

2. A fiber optics light switch as defined in claim 1 wherein said mass of light diverting material refracts optical energy transmitted from the first optical fiber.

3. A fiber optics light switch as defined in claim 2 further including a third optical fiber for receiving optical energy refracted by said mass of light diverting material.

4. A fiber optics light switch as defined in claim 1 wherein said light diverting material comprises discrete masses of reflecting and refracting material and said switch further includes a third optical fiber for receiving reflected optical energy when said reflective mass is interposed between said first and second optical fibers and a fourth optical fiber for receiving refracted optical energy when said refracting mass is interposed between said first and second optical fibers.

5. A fiber optics switch as defined in claim 4 wherein said light diverting material further includes a discrete mass of light absorbing material.

6. A fiber optics light switch as defined in claim 1 wherein said mass of light diverting material reflects optical energy transmitted from the first optical fiber.

7. A fiber optics light switch as defined in claim 6 further including a third optical fiber for receiving optical energy reflected from said mass of light diverting material.

8. A fiber optics light switch as defined in claim 7 wherein said third optical fiber is merged with said first optical fiber at a Y-shaped junction.

9. A fiber optics light switch for selectively diverting optical data signals normally transmitted in parallel from a first set of optical fibers to a second set of optical fibers, each fiber in said second set being axially aligned with a fiber in said first set, said switch including:
   a hollow, light-transmitting tube extending transversely through a space between adjacent ends of the first and second sets of fibers;
   a plurality of spaced, discrete masses of light diverting material contained within said hollow tube in a matrix of light transmitting fluid, the spacing of said discrete masses being related to the spacing between the fibers in said first and second sets; and
   means for altering the pressure within said hollow tube to move said spaced, discrete masses to desired positions relative to the fibers in said first and second sets.

10. A fiber optics light switch as defined in claim 9 wherein at least some of said discrete masses of light diverting material are refractive and said switch further includes a third set of optical fibers for receiving data signals refracted by any such refractive masses interposed between fibers in said first and second sets.

11. A fiber optics light switch as defined in claim 9 wherein at least some of said discrete masses of light diverting material are reflective and said switch further includes a third set of optical fibers for receiving data signals reflected from reflective masses interposed between fibers in said first and second sets.

12. A fiber optics light switch as defined in claim 1 wherein at least some of said discrete masses of light diverting material are refractive and said switch further includes a fourth set of optical fibers for receiving data signals refracted by any such refractive masses interposed between fibers in said first and second sets.

13. A fiber optics light switch as defined in claims 3, 4, 7, 10 or 11 wherein the hollow tube has lenticular surfaces for concentrating optical energy to be delivered to one or more of the optical fibers in said switch.

* * * * *